United States Patent [19]

Mattes

[11] 4,368,961
[45] Jan. 18, 1983

[54] SCENE-START AND -END REFERENCED INDICATOR ARRANGEMENT FOR PROJECTOR STORING SCENE-START AND -END FRAME COUNTS

[75] Inventor: Gerd Mattes, Schorndorf, Fed. Rep. of Germany

[73] Assignee: Robert Bosch GmbH, Stuttgart, Fed. Rep. of Germany

[21] Appl. No.: 898,846

[22] Filed: Apr. 20, 1978

[30] Foreign Application Priority Data

Apr. 22, 1977 [DE] Fed. Rep. of Germany ....... 2717912

[51] Int. Cl.³ ............................................. G03B 21/00
[52] U.S. Cl. ....................................... 352/129; 352/5; 352/171
[58] Field of Search ....................... 352/5, 27, 129, 171

[56] References Cited

U.S. PATENT DOCUMENTS 3,376,093  4/1968  Freudenschuss ...................... 352/5
3,977,776  8/1976  Wagensonner et al. ............. 352/171

Primary Examiner—Monroe H. Hayes
Attorney, Agent, or Firm—Michael J. Striker

[57] ABSTRACT

Each time the operator is projecting the start or end of what is to become an audio scene, he presses a store switch, commanding storage of the current frame count, thereby defining all the audio scenes on the film one after the other, for subsequent recording work. Thereafter, during recording work, the projector is referenced to the start and end frame counts of one scene at a time, one scene after another, as the operator controls semiautomatic recording work on successive scenes. A green, red and yellow indicator lamp are arranged in left-to-right order. When the film is ahead of the start of the referenced scene only the green lamp is bright, when past the end of the scene only the yellow, when in the middle of the scene only the red, when at the exact start of the scene both the green and red, when at the exact end of the scene both the red and the yellow.

9 Claims, 4 Drawing Figures

SCENE-START AND -END REFERENCED INDICATOR ARRANGEMENT FOR PROJECTOR STORING SCENE-START AND -END FRAME COUNTS

CROSS-REFERENCE TO RELATED APPLICATION

The present application discloses subject matter which can be used in the context of the method and system disclosed in copending, commonly assigned U.S. patent application Ser. No. 877,352. of Horst Sicha et al, filed Feb. 13, 1978 and entitled "METHOD AND APPARATUS FOR AUTOMATIC IMPLEMENTATION OF FADE-IN, FADE-OUT AND FADE-OVER RECORDING EFFECTS ON FILM," the entire disclosure of which is incorporated herein by reference.

BACKGROUND OF THE INVENTION

The present invention relates to sound-film motion-picture projectors of the type used for dubbing, rerecording or other editing or special-effects work. The above-identified commonly assigned copending patent application discloses a projection system of this type designed to greatly facilitate the work done when, for example, dubbing or rerecording. First, the operator establishes the scene-transition locations on the film where recording-transition effects are to be performed. Such an effect may be an audio fadeover coinciding with an image-fadeover transition, or a simple audio fade-out at the end of a scene, a simple audio fade-in at the start of a scene, or a fade-in, fade-out or fadeover to be effected right in the middle of a scene. To facilitate such work, that application discloses a system wherein the operator advances the film, either manually or during normal-speed full-light projection; when the start of a scene is being projected the operator presses a store button, and a minicomputer stores the frame count for the scene-start; likewise when the end of the scene is being projected the operator again presses the store button, and the minicomputer stores the frame count for the scene-end. After this scene-start and scene-end frame-count information has been stored and other programming of the system finished, dubbing or rerecording work starts. The operator switches the system over into automatic or semiautomatic operation, and among the things the system then does is to perform a high-speed rewind to a location ahead of the scene-start, followed by a switchover into forwards transport, and including the increasing and/or decreasing of the recording level pertaining to one or more sources of audio information at the times proper for the desired scene-transition effect, these operations being performed automatically or semiautomatically, e.g., when a certain amount of operator intervention is to be provided for. With that system, the operator may program the system and then dub on a scene-by-scene basis; i.e., first he stores the scene-start and scene-end frame counts for one scene, whereafter he dubs that scene, and only then begins work on the next scene. Alternatively, the operator may command storage of the scene-start and scene-end frame counts for all the scenes on the whole film, and only thereafter begin to dub the thusly defined scenes, one after another.

Whether working exclusively scene-by-scene or on a whole-film basis, a certain amount of confusion can arise, during the initial storing of scene-start and scene-end frame counts, during the subsequent dubbing or other recording work, and during the runthroughs for evaluating the success of the work done. When initially storing the scene-start and scene-end frame counts, after the first attempt to store the correct values, and before proceeding to dub, the operator will usually want rewind followed by forwards normal-speed projection, just to check the accuracy of the frame count storage before continuing with the dubbing of that scene or with the storing of frame-count information for the next scene. Likewise, during the dubbing per se, particularly if all operations are not performed entirely automatically, the operator needs to known when he is nearing the start of the scene of interest, when he is nearing the end of the scene of interest, when he has passed the end of the scene of interest, and so forth. The projected image will itself often constitute such information, but not necessarily, e.g., when the correlation between the audio information to be dubbed and the image information is not of a simple and self-evident character; likewise, the operator's attention will be diverted away from operations which he performs or whose automatic performance he is to monitor, if he must steadily refer to the projected image information as his source of reference-location information. If, instead of watching the projected image information per se, the operator monitors the projector's frame counter, this can be equally distracting, because the number displayed on the counter is raw information which the operator must mentally interpret, possibly even with reference to a jotted-down list of frame counts reminding him of where (at which scene, or which part of a scene) he is at a given moment in his work. All this becomes particularly distracting and inefficient when the work done includes sophisticated and artful transition effects, and where scenes must be repeatedly played back after dubbing to ascertain success and repeatedly done over until a successful result has actually been achieved.

SUMMARY OF THE INVENTION

Accordingly, it is a general object of the invention to improve upon such systems, by providing means which quickly and easily orient the operator with respect to the work he is doing, with respect to what scene has been reached, whether the middle of the scene is being projected, and whether the start or end of the scene is being neared, e.g., during both forwards and reverse transport and projection, to facilitate the work done when storing framecounts, the word done during subsequent recording, and the work done upon subsequent playback, evaluation and correction.

According to the broadest concept of the invention, the system is to be provided with indicator means operative for indicating to the operator when the projector has reached or passed a recording-transition location or is nearing a recording-transition location.

In the preferred embodiment of the invention, three indicator lights are arranged in a row, colored for example green, red and yellow, in that order. During projection of the scene of interest, e.g. right in the middle of the scene of interest, only the red indicator light is illuminated. When, during forwards or reverse transport and projection, or with the film at a standstill, the frame in the projection position is at a part of the film ahead of the scene of interest, only the green indicator light is illuminated; when the projected frame is at a part of the film past the end of the scene of interest, only the yellow indicator light is illuminated. When the projected frame is right at the start or end of the scene of interest, whether during initial storing of frame counts or during subsequent work, the red indicator light and also the respective one of the green and yellow indicator lights are illuminated, to help the operator distinguish scene-starts from scene-ends.

The novel features which are considered as characteristic for the invention are not set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
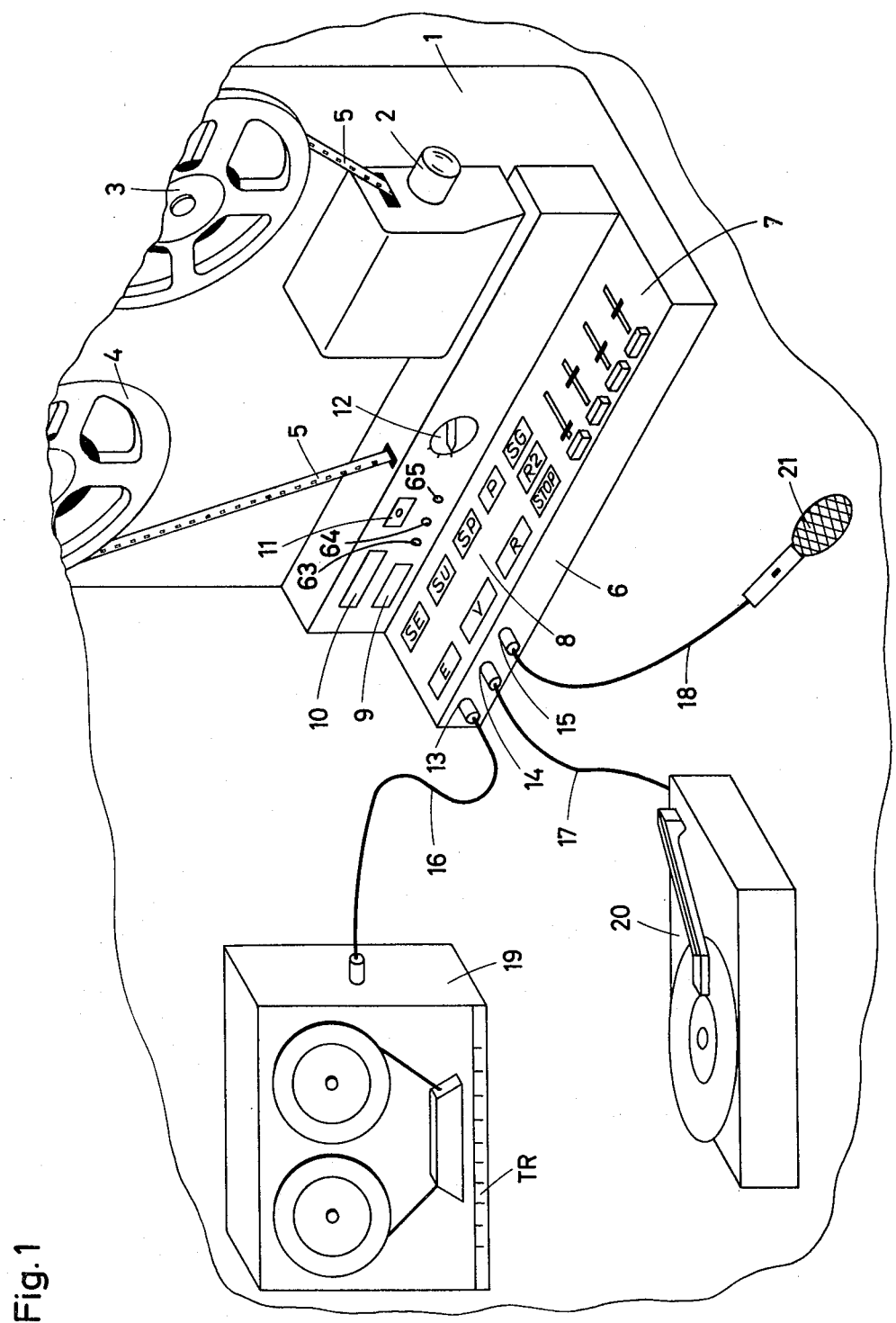
FIG. 1 is a perspective view of an exemplary set-up used for performing dubbing work.

The subject matter disclosed herein can be used in the context of the system and method disclosed in the copending commonly assigned application identified earlier, the entire disclosure of which is incorporated herein by reference. For the sake of convenience, the basics of such a system and method are illustrated herein and reviewed as follows:

FIG. 1 depicts an exemplary set-up doing dubbing work. Numeral 1 denotes a recording sound motion-picture film projector, numeral 2 its projection objective, numerals 3 and 4 the film reels and numeral 5 the sound motion-picture film.

The projector 1 has a control panel 6, subdivided into a mixing panel 7 and a command panel 8. Mixing panel 7 is used for manual control of the recording and playback amplifier of the projector, e.g., to set the recording level for different audio sources feeding into the projector. The command panel 8 is provided with a set of user-activated operation switches, commanding the performance of certain operations. The vertical housing wall directly above the command panel 8 includes a recording-level indicator 9, a window 10 for a frame-count display, a reset ("zero") button 11 for the frame (film increment) counter of the projector, a selector switch 12 for the selecting different types of recording-transition effects, and three scene-position indicators 63, 64, 65 discussed further below.

The frontmost vertical surface of the projector housing is provided with three input sockets 13, 14, 15 into which can be plugged the jacks of rerecording cables 16 and 17 and a microphone cable 18. These cables can be connected to a magnet-tape audio playback machine 19 (TR), a phonograph-record playback machine 20, and a microphone 21.

Figure 2:
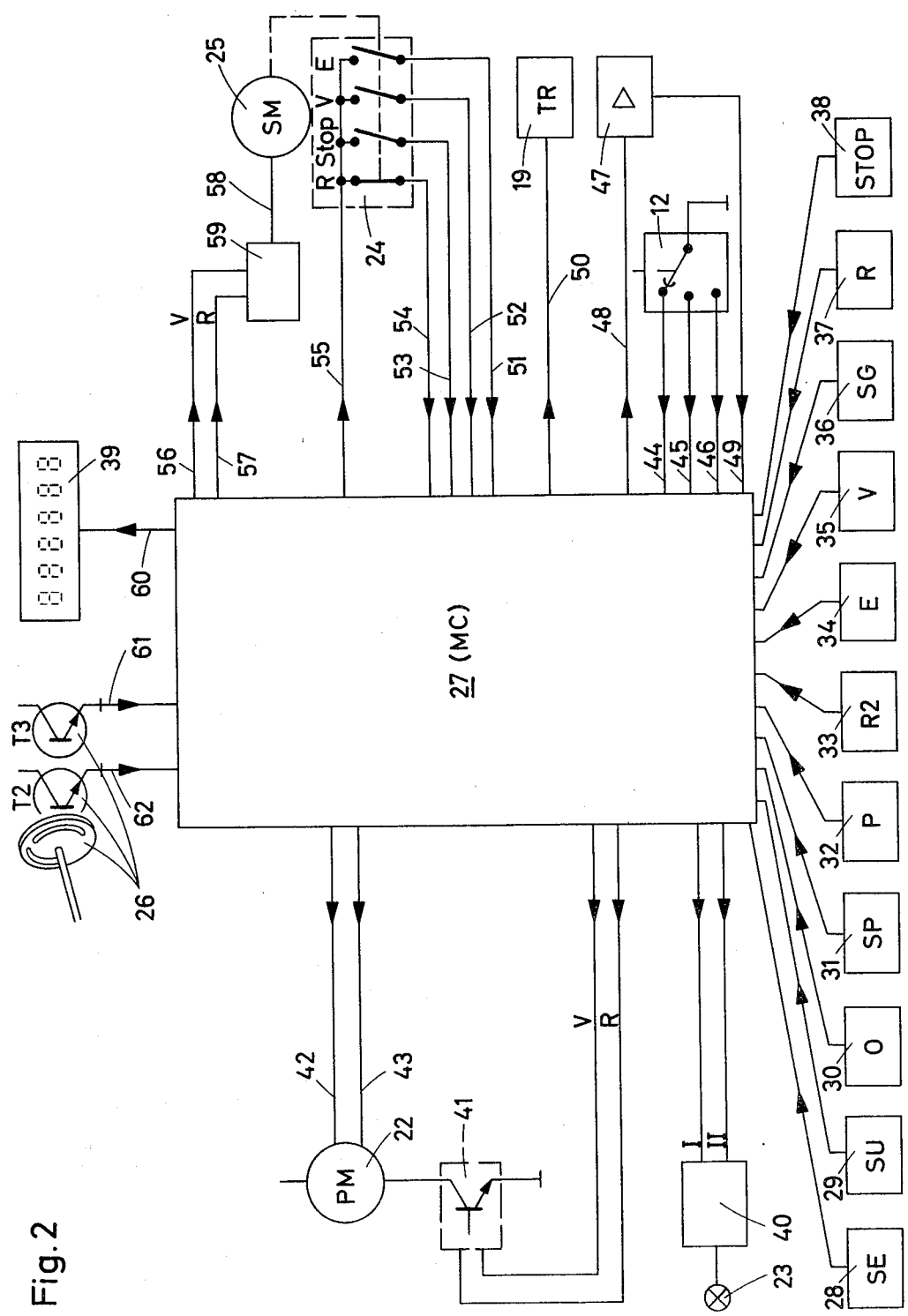
FIG. 2 is a schematic block circuit diagram illustrating the operator controls and the internal circuitry of the projector.
Figure 3:
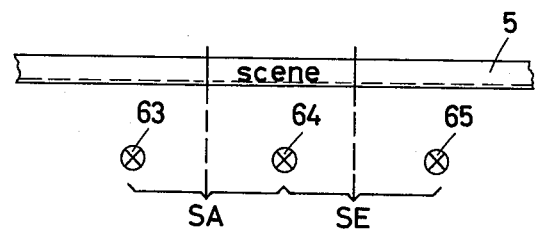
FIG. 3 is an explanatory drawing, showing three indicator lights and correlating their operation with the start and end of a scene, during the storing of scene-start and scene-end frame counts.
Figure 4:
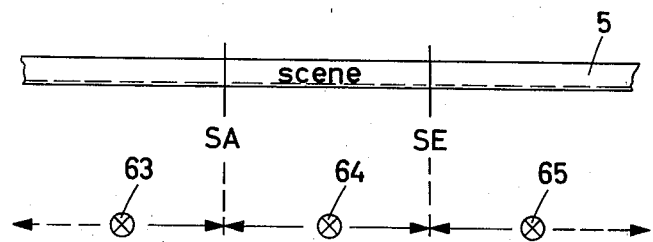
FIG. 4 is a similar explanatory drawing, correlating the three indicator lights with the work performed after storing of frame counts is completed.

FIG. 2 depicts the internal components of the projector 1. These include a projector motor 22 (PM) for film transport, a projector lamp 23, a central switching and control unit 24 for changing the settings of mechanical projector compnents (such as the film-loop former, the film guide plate at the projection window, etc.), and a servomotor 25 (SM) which changes the settings of the switches in unit 24. Also, the projector 1 includes a pulse generator unit 26 of conventional type, comprised of rotating sychronizer disk sensed by two phototransistors one of which generates frame-counter input pulses for forwards transport and the other for reverse transport.

The central switching unit of the projector 1 is a microcomputer 27 (MC). The operations performed by microcomputer 27 are commanded by the operation-command switches at the command panel 8. The operations performed by microcomputer 27, and how it is programmed to perform these, are explained in the copending application identified earlier. However, from the viewpoint of what the operator does, the operations commanded by the switches at command panel 8 are briefly reviewed as follows:

Switch 28 (SE):

The operator presses this switch once, to erase the most recently stored frame count. For example, after the operator has tried to cue in the start of a scene and then stored that frame count, if he is dissatisfied with his attempt, he presses switch 28 and tries again. If switch 28 is pressed twice, not once, then the two most recently stored frame counts are erased. For example, after the operator has stored the frame counts for both the start and end of one scene, he may be dissatisfied with both, and wish to do the whole scene over.

Switch 29 (SU):

When the operator wishes to go to the next scene, he presses this switch. For example, after the dubbing of one scene has been completed, the operator may go on to the dubbing of the next scene. The dubbing of each scene is semi-automatically performed in dependence upon the scene-start and scene-end frame counts. Thus, when going on to the next scene, the scene-start and scene-end frame counts for the next scene must now be used as reference information. When the operator presses this switch 29 (SU), the scene-end frame count for the scene just worked on automatically converts into the scene-start frame count for the next scene to be worked on.

Switch 30 (O):

The operator presses this switch to reset the projector's frame counter 39 and thereby also the frame-count indicator, for example so that the frame count for the start of the first of the series of scenes will conveniently be zero.

Switch 31 (SP):

This is the store command switch, which the operator presses whenever he wishes to store the frame count of the frame currently being projected. For example, when trying to establish the end of the scene, the film is forwards-transported and projected, and as soon as the operator sees the end of the scene being projected, he immediately presses store switch 31 (SP). The microcomputer is capable of storing a number of different frame counts sufficient to include all recording-transition locations likely to be established for the whole film.

Switch 32 (P):

This is a return-to-start switch. When the operator is doing frame-count storing work, scene by scene, on the whole film, e.g., preliminary to any dubbing work at all, and when all storing work is finished, the operator presses this switch 32 (P) and the projector automatically rewinds to a point ahead of the start of the first of the series of scenes. Then, during the subsequent dubbing work, this switch 32 (P) commands a different operation. After the dubbing of any one scene has been finished, and the operator wants to play back the just-finished scene to evaluate success, he presses this switch 32 (P) and the projector automatically rewinds to a point ahead of the start of the just-finished scene.

Switch 33 (R2):

The operator presses this switch to command reverse transport and projection at 2 frames per second, with attenuated projection light to prevent damage to the slowly transported film.

Switch 34 (E):

The operator presses this switch for film threadin with the projector lamp shut off.

Switch 35 (V):

The operator presses this switch to initiate forwards transport with full projection light.

Switch 36 (SG):

The operator presses this switch to command high-speed film transport, for both forwards and reverse transport, with full projection light.

Switch 37 (R):

This switch, too, is pressed to command reverse film transport with reduced projection light.

Switch 38 (STOP):

The operator presses this switch to stop the projector, i.e., to terminate film transport if not already terminated and shut off the projection lamp.

The projection lamp 23 is controlled by the microcomputer 27, via a relay 40, to assume either a full-light state (I) or a reduced-light state (II). The projector motor 22 is controlled by the microcomputer 27, via an electronic switching unit 41, for both forwards (V) and reverse (R) film transport. The rpm-regulation of the projector motor 22 is likewise performed by the microcomputer 27, via lines 42 and 43. The selector switch 12 is used to select different types of recording-transition effects. It has three lines 44, 45, 46 connected to the microcomputer 27, respectively associated with the commands fadeover, soft (gradual) fade-in and hard (abrupt) fade-in. The connection between the magnetic-tape playback machine 19 (TR) and the microcomputer 27 is effected via line 50. The central switching and control unit 24 is connected to microcomputer 27 via lines 51, 52, 53, 54, 55. The servomotor 25, which changes the settings of the unit 24, is controlled by the microcomputer via lines 56, 57, 58 and a switching unit 59. The audio amplifier 47 of the projector is connected to the microcomputer 27 via lines 48 and 49, which provide control signals for turning the amplifier on and off, switching it over between record and playback modes, and for varying its gain to vary recording level during recording. The frame-count indicator 39, and likewise the three indicator lights 63, 64, 65, are controlled by the microcomputer 27, through the intermediary of a (symbolically indicated) output driver stage 60. The pulse generator 26 is connected to the microcomputer 27 via input lines 61, 62, which respectively apply input pulses for frame counting for forwards transport and for reverse transport.

The three indicator lamps 63, 64, 65 are, for example, arranged in a horizontal row and are respectively green (left), red (middle) and yellow (right).

The three indicator lamps 63, 64, 65 are illuminated in different combinations to guide the operator, both during the initial work of defining scenes by storing their scene-start and scene-end frame counts, and also during the post-storing rerecording or dubbing work performed upon the thusly defined scenes.

The manner in which the three indicator lamps 63, 64, 65 light up during initial frame-count storing work is as follows:

The operator begins by storing the frame count for the start of the first scene, in the manner described earlier. Until the first-scene scene-start frame count is stored, there are no stored frame counts. With no frame counts stored, none of the indicator lamps 63, 64, 65 is illuminated.

When the frame corresponding to the first-scene scene-start is being projected, the operator presses store switch 31 (SP) for the first time, and the first-scene scene-start frame count is stored. When this is done, the green indicator light 63 (left) and the red indicator light 64 (middle) both light up; the lighting up of these two indicator lights in conjunction indicates to the operator that the projector is projecting the start of the first scene.

If, to locate this first-scene scene-start, the operator manually advances the film, and then pressed store switch 31 (SP) with the film at a standstill, this green + red indication will continue indefinitely, until film transport is resumed. If the operator decides that he made a mistake and therefore passes the erase switch 28 (SE) to erase the just stored first-scene scene-start frame count, then once again no frame counts are stored and therefore green lamp 63 and red lamp 64 go dark; i.e., as indicated above, all lamps 63, 64, 65 are dark when no frame counts are stored.

Now, with only the first-scene scene-start frame count stored, when film transport continues (either because the film was already in transport when store switch 31 was pressed with this transport has not yet been discontinued, or because the film was at a standstill and the operator now commands forwards or reverse transport), the green + red indication is replaced by a different indication, depending upon the transport direction. If the film is now (or simply continues to be) forwards transported, then as soon as the next pulse is received from pulse generator 26 the green lamp 63 goes dark, but the red lamp 64 continues to be illuminated. Now it is only the red lamp 64 which is illuminated, informing that operator that he is past the start of the first scene, i.e., that the frame count is higher than the stored first-scene scene-start frame count. When the operator is projecting the end of the first scene and presses store switch 31 to store the first-scene scene-end frame count, both the red lamp 64 and the yellow lamp 65 are bright, indicating the exact end of the first scene. As the film is transported further in forwards direction, the red lamp 64 goes dark, leaving only the yellow lamp 65 bright, indicating that one has passed the end of the scene.

After the first-scene scene-start frame count and the scene-end frame counts of the first and all subsequent scenes have been stored, the dubbing work per se is ready to begin, and it is especially at this point that the guidance provided by the scene-referenced indicator lamps 63, 64, 65 becomes important for the operator. In particular, after all the frame counts defining scenes have been stored, the operator presses the return-to-start switch 32 (P) for the first time, signalling that storing of frame counts is finished, and commanding the projector to rewind to a point ahead of the start of the first scene.

As explained in the earlier-identified copending application, the projector is now referenced to the start and end frame counts of the first scene. When the projector is referenced to the first scene, the lamps 63, 64, 65 light up according to the following schedule: frame count lower than the first-scene start count, 63 (green) only; frame count equal to the first-scene start count, 63 (green) and 64 (red) only; frame count between the first-scene start count and the first-scene end count, 64 (red) only; frame count equal to the first-scene end count, 64 (red) and 65 (yellow) only; frame count higher than the first-scene end count, 65 (yellow) only. This schedule applies no matter what transport operations are commanded, so long as the projector continues to be referenced to the first scene. The operator effects the dubbing or rerecording of the first scene, typically rewinds and plays back to evaluate success, and is eventually satisfied and ready to go onto the dubbing or rerecording of the second scene.

As likewise explained in the earlier-identified application, to go on to the next (here, second) scene, the operator presses the scene-changeover switch 29 (SU). As a result, the projector now references itself to the start and frame counts of the second scene; the second-scene start count is in general equal to the first-scene end count, and as explained in the copending application, the pressing of scene-changeover switch 29 (SU) the first time causes the first-scene scene-end frame count to replace the first-scene scene-start frame count, and the second scene scene-end frame count to replace the first-scene scene-end frame count. Switch 29 (SU) having been pressed this first time, the projector is referenced to the second scene, and the lamps 63, 64, 65 light up according to the following schedule: frame count lower than the second-scene start count, 63 (green) only; frame count equal to the second-scene start count, 63 (green) and 64 (red) only; frame count between the second-scene start count and the second-scene end count, 64 (red) only; frame count equal to the second-scene end count, 64 (red) and 65 (yellow) only; frame count higher than the second-scene end count, 65 (yellow) only.

It will be appreciated that this schedule for the lighting up of the indicator lamps 63, 64, 65 when the projector is referenced to the second scene is the same as when the projector is referenced to the first scene, the difference being only which scene serves as the reference.

Likewise, when the operator eventually presses scene-changeover switch 29 (SU) a second time, to go on to the dubbing work for the third scene, the above-defined schedule is again followed, but now referenced to the third scene.

Thus, for the dubbing performed after the frame-count storing work, the indicator lamps 63, 64, 65 are referenced to one scene at a time, one scene after the other, as the operator goes on from one scene to the next. For the scene serving as a reference at any given time, a red-only (64) indication is given when the projected frame is in the middle of the scene, a green-only (63) indication when the projected frame is ahead of the start of the scene, a yellow-only (65) indication when the projected frame is past the end of the scene, a green + red indication (63, 64) when the projected frame is right at the start of the scene, and a red + yellow indication (64, 65) when the projected frame is right at the end of the scene.

It will be understood that each of the elements described above, or two or more together, may also find a useful application in other types of indicator arrangements differing from the types described above.

While the invention has been illustrated and described as embodied in a particular recording sound motion-picture film projector, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a sound motion-picture film projector including a forwards-backwards frame counter operative for ascertaining frame count during both forwards and reverse transport operations and means activatable by the operator for commanding the automatic storage of frame counts which are to define the starts and ends of scenes to be worked on, an indicator arrangement for indicating position relative to stored frame counts, the indicator arrangement comprising two indicators, one operative for indicating that the frame count is lower than a predetermined stored frame count and the other operative for indicating that the frame count is higher than the predetermined stored frame count.

2. In a projector as defined in claim 1, said predetermined stored frame count being a first frame count, the indicator arrangement furthermore including a third indicator operative for indicating that the frame count is higher than a second predetermined stored frame count, the second stored frame count being the stored frame count next-higher than the first stored frame count.

3. In a projector as defined in claim 1, the two indicators being jointly operative for indicating that the frame count is equal to the predetermined stored frame count.

4. In a projector as defined in claim 2, the three indicators being a first, a second and a third indicator, the first and second indicators being jointly operative for indicating that the frame count is equal to the first stored frame count, the second and third indicators being jointly operative for indicating that the frame count is equal to the second stored frame count.

5. In a projector as defined in claim 1, the indicators being illuminatable indicators illuminated when operative.

6. In a projector as defined in claim 1, the two indicators being arranged on a horizontal line, the left one of the two indicators indicating frame counts lower than the predetermined stored frame count, the right one of the two indicators indicating frame counts higher than the predetermined stored frame count.

7. In a projector as defined in claim 4, the first, second and third indicators being arranged on a horizontal line, the first being at the left, the third at the right and the second in the middle.

8. In a projector as defined in claim 1, the two indicators being distinguishable from each other with respect to the color of the indications they provide.

9. In a projector as defined in claim 4, the three indicators being distinguishable from one another with respect to the color of the indications they provide.

* * * * *